Dec. 12, 1961 R. NAEGELI 3,012,399
JEWEL BEARING FOR WATCHES AND APPARATUS
Filed June 25, 1958
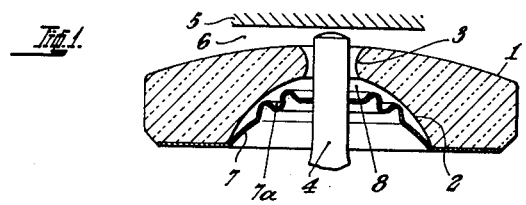
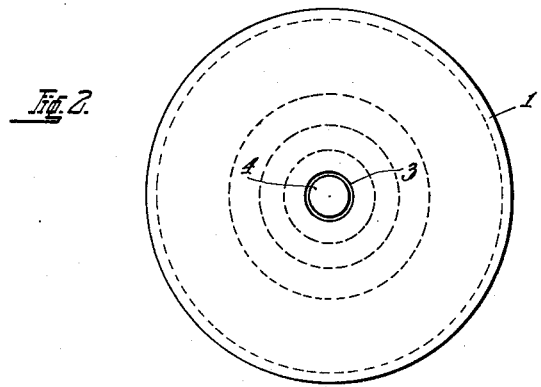
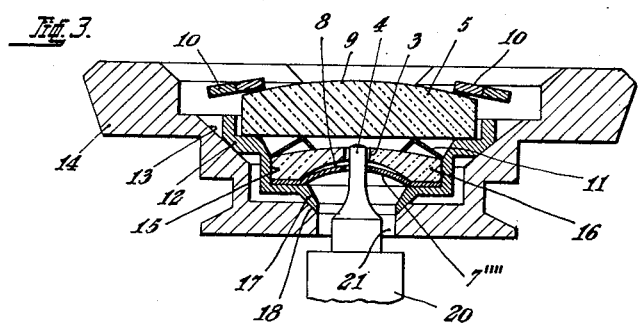
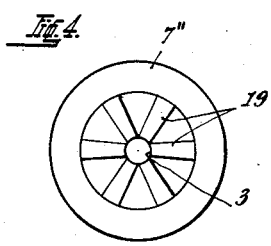
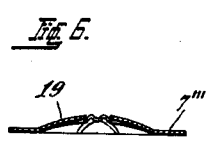
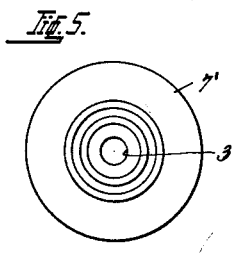
INVENTOR:
RUDOLF NAEGELI
BY Leon M. Strauss
AGT.

United States Patent Office 3,012,399
Patented Dec. 12, 1961

3,012,399
JEWEL BEARING FOR WATCHES AND
APPARATUS
Rudolf Naegeli, Kramburgstrasse 16, Berne, Switzerland
Filed June 25, 1958, Ser. No. 744,531
Claims priority, application Switzerland July 10, 1957
5 Claims. (Cl. 58—140)

The smooth working of every watch provided with a balance-wheel depends essentially on the design of the bearings for the balance-staff. With balance-wheels, these bearings are formed unilaterally to the bearing point of the pivots and, following a relatively short period after oiling, the oil withdraws from the actual friction and supporting point of the pivots due to the effect of bearing changes in the watch and due to the small quantity of oil in the bearing itself whereupon the pivots run dry. In addition, the hole of the bearing jewel is so constructed that it tends to run dry because conventionally it is not cylindrical but is narrowest, in the shape of an olive, at the center of the length of the jewel hole and widens out towards either side thereof. In small watches, an endstone is fitted at the outer end of each bearing jewel leaving a small clearance between bearing jewel and endstone. This endstone is closed off to the outside so that the oil is preferably displaced outwardly due to adhesion from the hole of the bearing jewel to the straight inside face of the endstone. The bearings are open at their ends and there is nothing to prevent the oil from moving inwardly with the result that the oil either collects between the inside face of the endstone and the outside of the bearing jewel or moves towards the open inside. Since the quantity of lubricating oil originally supplied is small, the staff pivot is thus at its central supporting point without lubrication after a short period.

According to the invention, the bearing jewel is formed as symmetrically as possible in the axial direction from the narrowest point of the hole towards either end thereof so that oil applied to the bearing is in balance from the narrowest point towards either side. On the inside of the bearing jewel opposite the endstone, there is fitted a disc which together with the inside of the oil sink of the bearing jewel forms a capillary space at the end of the widening of the hole similar to that formed by the outside face of the bearing jewel and the inside face of the endstone to retain and receive oil which may flow out of the jewel hole. This design of the bearing maintains the balance with the opposite side provided with the endstone and results in a much smaller and slower withdrawal of oil from the jewel hole. Due to the capillary space, it is at the same time possible to increase the total quantity of oil at the bearing point since the space for the oil is larger and thus good lubrication of the pivot is assured at the bearing point.

The object of the present invention is a jewel bearing for the pivots of various parts of movements for watches and apparatus and in particular for balance-staffs having unilateral or oscillating rotation in which at least at the inner end of the bearing jewel there is provided a disc having a hole slightly larger than the diameter of the pivot and a central dished portion forming a space in the axial direction between the inner face of the bearing jewel and the outer face of said disc so that between both faces a narrow annular space is formed which is in communication with the inner end of the jewel hole and permits a larger quantity of oil to be contained by the bearing and into which oil issuing from the end of the bearing towards the staff can enter.

By way of example, two embodiments of the object of the invention are shown in the accompanying drawing, in which:

FIG. 1 is a sectional detail view through a bearing jewel showing the pivot and endstone of a bearing according to the invention.

FIG. 2 is a top plan view of the invention shown in FIG. 1,

FIG. 3 is a sectional detail view of a complete bearing with setting,

FIG. 4 is a top plan view of a modified capillary disc,

FIG. 5 is a top plan view of another modification of a capillary disc, and

FIG. 6 is a sectional view through the capillary disc shown in FIG. 5.

According to FIG. 1, the bearing jewel 1 has its outside convexly curved whilst in the center of the flat inside face there is recessed a cavity 2. In the center, the jewel has, in addition, a through hole 3 while is enlarged and ovalized towards its ends so that the pivot 4 of the staff contacts the wall of the hole at the center only and is guided at that point only. Spaced from the outside of the bearing jewel there is an endstone 5, and between the two jewel faces an interspace 6 is provided for oil issuing from the jewel hole. On to the inside face of the bearing jewel and within the recess 2 there is fitted a disc 7 provided with an outwardly projecting edge. The disc has a dished shape directed inwardly and is slightly flatter than the recessed cavity 2 of the bearing jewel 1. Thus, between the two boundary surfaces of the cavity and the curvature of the disc 7, a free interspace 8 is created in which oil flowing out of the jewel hole towards the inside is caught and retained. The interspace between the two boundary surfaces is narrow at the periphery, becomes larger towards the hole and has an annular gap opening directed inwardly so that oil reaching it is drawn between pivot and hole by the capillary action of the annular gap, can enter it and is retained by it. Oil flowing out of the hole 3 in the opposite direction collects in the interspace 6. Thus the effect of this is that both amounts of oil present in the hole 3, at the opposite ends thereof, are held in balance by the oil present in the hole itself. The disc 7 in combination with the cavity 2 serves as a reservoir to increase the space for the oil and thus supply the hole 3 with oil as long as there is any oil left in the hole.

The disc 7 may be provided with grooves, elevations or depressions concentric with the hole 3 as shown at 7 and 7' in FIGS. 1 and 5, respectively or with radially disposed furrows 19 as can be seen in FIGS. 4 at 7" and 6 at 7''', and the hole in the center has a slightly larger diameter than that of the pivot so as to permit small relative movement while the disc serves to equalize shocks through yielding action until both the pivot and disc 7 can return again into their original position under axial spring action.

FIG. 3 is a cross-section of a complete bearing. The endstone 5 is provided with a convex outside surface 9 against which the two limbs 10 of a spring press axially. The inside of the endstone is ground flat, and the endstone is fitted into the outer recess of a centering ring 12 which is adjustably held in the taper 13 of the carrier ring 14. The centering ring 12 has inwardly of the larger recess another one of smaller diameter 15 in which the bearing jewel 16 as well as the disc 7'''' are held concentrically. The centering ring is closed inwardly by a tapered end portion 17 the outer taper of which engages the tapered recess 18 in such a manner that the centering ring is adjustably guided and held in the tapered recess of the carrier ring 14.

The pivot 4 of the balance-staff 20 is inserted into the hole of the bearing jewel 16 from the inside through the hole 21 in the carrier ring and the centering ring and through the disc 7 and finds an abutment on the endstone 5.

Between the endstone 5 and the bearing jewel 16, an annular spring 11 may be inserted to prevent the oil from flowing out of the bearing too far in the radial direction.

Various changes and modifications may be made without departing from the spirit and scope of the present invention and it is intended that such obvious changes and modifications be embraced by the annexed claims.

Having thus described the invention, what is claimed as new and desired to be secured by Letters Patent is:

1. A jewel bearing for the pivots of watches and apparatus and in particular of balance-staffs with unilateral or oscillating rotation, comprising: a bearing jewel provided with a central hole and a recess in the inner surface thereof; a staff with a pivot extending into said hole; an endstone, and a disc, said disc being fitted to the said inner surface and extending into said recess of said bearing jewel and having a hole slightly larger than the diameter of said pivot and being formed with a central dished portion the outer face thereof forming an annular space between the recessed inner face of said bearing jewel and said disc, said annular space being so narrow that it subjects the oil present in the hole of said bearing jewel to a capillary action to prevent said oil from flowing out of the bearing.

2. A jewel bearing according to claim 1, said disc being provided on its dished portion with annular grooves concentric with its hole to increase the oil adhesion.

3. A jewel bearing according to claim 1, said disc having radially disposed elevations and depressions to determine the axial spacing of the adjacent faces of said bearing jewel and said disc.

4. A bearing for the pivots of watches and apparatus and in particular for balance staffs, comprising a bearing jewel provided with a central hole and a recess opening on the inside surface thereof; a staff with a pivot, said pivot extending through said hole, a disc, said disc being fitted to said inside surface of said bearing jewel and extending into said recess, said disc having a hole slightly larger than the diameter of said pivot and being formed with a central dished portion forming an interspace in the axial direction between the inside of said bearing jewel and the outside of said disc so that a narrow annular space is formed in communication with said hole.

5. A jewel bearing for the pivots of watches and apparatus and in particular for balance staffs with unilateral or oscillating rotation, comprising a bearing jewel provided with a central hole and a recess opening on the inside surface thereof; a staff with a pivot, said pivot extending into said recess, a disc, said disc being fitted to said inside surface of said bearing jewel and extending into said recess, said disc having a hole slightly larger than the diameter of said pivot and forming an interspace in the axial direction between the inside of said bearing jewel and the outside of said disc so that a narrow annular space is formed which is in communication with said hole and increases the oil capacity of the bearing and into which oil flowing axially out of the end of the bearing towards the staff can enter and be prevented from flowing further and from whence re-entry of the oil into the bearing is promoted by capillary action.

References Cited in the file of this patent

UNITED STATES PATENTS

| 1,041,335 | Nutting | Oct. 15, 1912 |
| 2,671,309 | Marti | Mar. 9, 1954 |

FOREIGN PATENTS

| 259,875 | Switzerland | July 1, 1949 |
| 286,919 | Switzerland | Mar. 2, 1953 |
| 308,037 | Switzerland | Sept. 1, 1955 |